United States Patent
Wolfrum et al.

[11] 3,775,049
[45] Nov. 27, 1973

[54] CONTINUOUS DYEING OF POLYESTER FIBRES WITH AZO DYESTUFFS SOLUBLE IN WATER-IMMIRSCIBLE HALOGENATED HYDROCARBONS

[75] Inventors: Gerhard Wolfrum, Opladen; Rutger Neeff; Winfried Kruckenberg, both of Leverkusen, all of Germany

[73] Assignee: Bayer Aktiengesellschaft, Leverkusen, Germany

[22] Filed: Dec. 18, 1970

[21] Appl. No.: 99,719

[30] Foreign Application Priority Data
Jan. 2, 1970    Germany.................... P 20 00 131.4

[52] U.S. Cl............................... 8/41 C, 8/26, 8/82, 8/41 B, 8/41 D, 8/50, 260/158, 260/173, 260/174, 260/207.1
[51] Int. Cl. ....................... D06p 1/18, C09b 29/06
[58] Field of Search ..................... 8/26, 41, 94, 174; 260/158, 207.1

[56] References Cited
UNITED STATES PATENTS

| | | |
|---|---|---|
| 3,510,243 | 5/1970 | Seuret et al............................ 8/94 X |
| 3,398,137 | 8/1968 | Mueller............................ 260/207.1 |
| 3,579,497 | 5/1971 | Ramanathan et al.............. 260/158 |
| 3,586,663 | 6/1971 | Kruckenberg ........................ 8/41 X |
| 3,313,590 | 4/1967 | Delano et al. ........................ 8/94 X |
| 3,046,076 | 7/1962 | Upshur ................................. 8/94 X |
| 3,579,497 | 5/1971 | Ramanathan et al................. 8/41 X |
| 3,122,410 | 2/1964 | Mueller et al........................ 8/41 R |
| 3,096,320 | 7/1963 | Lange et al. ........................ 260/158 |
| 3,057,848 | 10/1962 | Dehn, Jr. et al. .................... 260/158 |

FOREIGN PATENTS OR APPLICATIONS

| | | |
|---|---|---|
| 1,192,984 | 5/1970 | Great Britain.......................... 8/174 |
| 1,581,325 | 9/1969 | France |
| 832,343 | 1/1970 | Canada |

*Primary Examiner*—George F. Lesmes
*Assistant Examiner*—Patricia C. Ives
*Attorney*—Plumley & Tyner

[57] ABSTRACT

Process for the continuous dyeing of synthetic fibre materials from organic solvents wherein the fibre materials are impregnated with dyeing liquors containing azo dyestuffs which are soluble in organic solvents and correspond to the formula

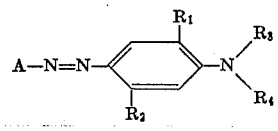

in which A, $R_1$, $R_2$, $R_3$ and $R_4$ have the meaning given in the disclosure and are subsequently subjected to a heat treatment.

15 Claims, No Drawings

CONTINUOUS DYEING OF POLYESTER FIBRES WITH AZO DYESTUFFS SOLUBLE IN WATER-IMMIRSCIBLE HALOGENATED HYDROCARBONS

The invention relates to a process for the continuous dyeing of synthetic fibre materials; more particularly it concerns a process for the continuous dyeing of synthetic fibre materials from organic solvents wherein the fibre materials are impregnated with dyeing liquors containing azo dyestuffs which are soluble in organic solvents and correspond to the formula

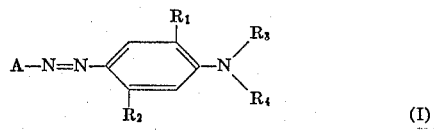

(I)

in which
A denotes the radical of a carbo- or heterocyclic diazo component;
$R_1$ means hydrogen, a chlorine or bromine atom, a methyl, methoxy or ethoxy group;
$R_2$ is hydrogen, a chlorine or bromine atom, a methyl, methoxy, ethoxy group or an acylamino group of the formula $-NH-CO-R_5$
where $R_5$ stands for a $C_1-C_{17}$-alkyl, cycloalkyl, benzyl radical, a phenyl radical which may be substituted by $C_1-C_4$-alkyl group or a phenoxymethyl radical, an acyloxymethyl group containing one – 18 carbon atoms in the acyl radical, a methoxymethyl, chloromethyl, $C_1-C_{18}$-alkoxy group or a dialkylamino group containing one – 18 carbon atoms;
$R_3$ denotes the groupings $+(C_nH_{2n}-O)_m CO-R_6$ or

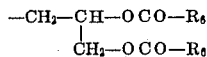

where $R_6$ stands for a $C_3-C_{17}-$, preferably $C_4-C_7$-alkyl radical, a cycloalkyl radical, a phenyl radical which may be substituted by $C_1-C_{12}$-alkyl groups, or a benzyl or phenoxy methyl radical which may be substituted by $C_1-C_{12}$-alkyl groups;
$m$ means 1 or 2; and
$n$ is 1, 2 or 3; and
$R_4$ denotes hydrogen, a $C_1-C_6$-alkyl radical, a benzyl radical which may be substituted by halogen atoms, $C_1-C_4$-alkyl or $C_1-C_4$ alkoxy groups, a $\beta$-phenylethyl, $\beta$-cyanoethyl, $\beta$-methoxyethyl, $\beta$-ethoxyethyl, $\beta$-$C_1-C_8$-alkylsulphonyl-ethyl, $\beta$-phenylsulphonylethyl or $\beta$-vinylsulphonyl-ethyl radical, or $R_4$ has the same meaning as $R_3$;
with the proviso that the sum total of carbon atoms contained in the substituents $R_1$, $R_2$, $R_3$ and $R_4$ amounts to at least 6 and at most 28, preferably to 10 to 20, and that the materials are subsequently subjected to a heat treatment.

For $R_5$ and $R_6$ there may be mentioned by way of example:
as $C_3-C_{17}$-alkyl radicals, the propyl, iso-propyl, n-butyl, iso-butyl, sec.-butyl, tert.-butyl, n-pentyl, iso-amyl, sec.-pentyl, neopentyl, n-hexyl, methyl-pentyl, dimethyl-butyl, n-heptyl, methyl-hexyl, dimethyl-pentyl, trimethyl-butyl, n-octyl, iso-octyl, methyl-heptyl, dimethyl-hexyl, trimethyl-pentyl, tetramethyl-butyl, n-nonyl, iso-nonyl, dimethyl-heptyl, trimethyl-hexyl, decyl, undecyl, dodecyl, 2,2-dimethyl-decyl, tetradecyl, hexadecyl and stearyl radicals and for $R_5$ as $C_1$- and $C_2$-alkyl radicals the methyl and ethyl radicals; as cycloalkyl radicals, the cyclohexyl, methyl-cyclohexyl and 4-tert.-butyl-cyclohexyl radicals; as aralkyl radicals, in particular, the benzyl or dodecyl-benzyl-radical.

For $R_6$ there may be mentioned as phenyl radicals substituted by $C_1-C_{12}$-alkyl groups, for example: the 4-methyl-phenyl, 2,4-dimethyl-phenyl, 4-tert.-butyl-phenyl, 4-nonyl-phenyl, 4-dodecyl-phenyl radicals.

The dyestuffs to be used for dyeing from organic solvents according to the invention are obtained by known methods, for example, by diazotising an aromatic carbocyclic or a heterocyclic diazo component of the formula $A-NH_2$ and coupling the resultant diazonium salts with compounds of the formula

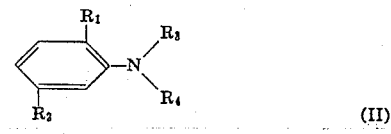

(II)

in which $R_1$, $R_2$, $R_3$ and $R_4$ have the same meaning as in formula (I).

Suitable coupling components are primarily those amines of the formula (II) in which a.
$R_4$ denotes an ethyl group;
$R_3$ stands for a $\beta$-acyl-oxy-ethyl group in which the acyl radical is a tert.-butyl-carbonyl, pentyl-(3)-carbonyl, heptyl-(3)-carbonyl, heptadecyl-carbonyl or 4-tert.-butyl-phenyl-carbonyl radical;
$R_1$ means hydrogen, a methyl, methoxy or ethoxy group; and
$R_2$ is hydrogen, a chlorine atom, a methyl group or an acylamino group in which the acyl radical is an acetyl, ethoxy-carbonyl, t-butyl-carbonyl, pentyl-(3)-carbonyl, 4-tert.-butyl-phenyl-carbonyl or dibutylamino-carbonyl radical.

b.
$R_4$ denotes a $\beta$-cyanoethyl group;
$R_3$ stands for a $\beta$-acyloxy-ethyl group in which the acyl radical is a tert.-butyl-carbonyl, i-butyl-carbonyl, sec.-butyl-carbonyl or 4-propyl-phenyl-carbonyl radical;
$R_1$ denotes hydrogen, a methyl, methoxy or ethoxy group; and
$R_2$ means hydrogen, a bromine atom, a methyl group or an acylamino group in which the acyl radical is an ethoxycarbonyl, 4-tert.-butyl-phenoxy-carbonyl, tert.-butylcarbonyl, heptadecyl-carbonyl or phenoxymethyl-carbonyl radical.

c.
$R_4$ denotes a benzyl group;
$R_3$ stands for a $\beta$-acyloxy-ethyl group in which the acyl radical is a n-butyl-carbonyl, i-amyl-carbonyl, heptadecyl-carbonyl, t-butyl-carbonyl, sec.-amyl-carbonyl or heptyl-(3)-carbonyl radical;
$R_1$ denotes hydrogen, a methyl, methoxy or ethoxy group; and
$R_2$ means hydrogen, a chlorine atom, a methyl or methoxy group or an acylamino group in which the acyl radical is a 4-methyl-benzoyl, n-butyl-carbonyl, heptyl-(3)-carbonyl or benzyl-carbonyl group.

d.

R₄ denotes a β-phenyl-ethyl group;

R₃ stands for a β-acyloxy-ethyl group in which the acyl radical is a butyryl, i-amyl-carbonyl, t-butyl-carbonyl, pentyl-(3)-carbonyl or heptyl-(3)-carbonyl radical;

R₁ denotes hydrogen, a methyl, methoxy or ethoxy group; and

R₂ means hydrogen, a chlorine atom, a methyl group or an acylamino group in which the acyl radical is an acetyl, 4-t-butyl-benzoyl, t-butyl-carbonyl, cyclohexyl-carbonyl or heptyl-(3)-carbonyl radical.

e.

R₃ and R₄ denote a β-acyloxy-ethyl group in which the acyl radical is a butyryl, t-butyl-carbonyl, pentyl-(3)-carbonyl, heptyl-(3)-carbonyl, heptadecyl-carbonyl, 4-t-butyl-benzoyl, benzyl-carbonyl or phenoxymethyl-carbonyl radical;

R₁ denotes hydrogen, a methyl, methoxy or ethoxy group; and

R₂ means hydrogen, a chlorine atom, a methyl or methoxy group or an acylamino group in which the acyl radical is a propionyl, t-butyl-carbonyl, pentyl-(3)-carbonyl, 4-t-butyl-benzoyl, ethoxy-carbonyl, n-butyoxy-carbonyl, benzoyl, benzyl-carbonyl or phenoxy-methyl-carbonyl radical.

f.

R₃ denotes a β-(heptyl-(3)-carbonyl-oxy)-ethyl group;

R₄ stands for a β-phenylsulphonyl-ethyl, β-vinylsulphonyl-ethyl group or a β-alkylsulphonyl-ethyl group in which the alkyl radical is a methyl, ethyl, butyl or octyl group;

R₁ denotes hydrogen, a methyl, methoxy or ethoxy group; and

R₂ means hydrogen, a chlorine atom, a methyl group or an acylamino group in which the acyl radical is an acetyl, benzoyl or t-butyl-carbonyl radical.

Among the azo dyestuffs to be used according to the invention those dyestuffs of the formula (I) have proved particularly satisfactory, in which A stands for a phenyl radical of the formula

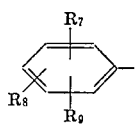

(III)

in which

R₇ denotes a halogen atom, a C₁—C₄-alkyl, C₁—C₄-alkoxy, C₁—C₄-alkoxy-carbonyl, cyclohexoxycarbonyl-, tri-fluoromethyl, nitro, cyano, C₁—C₂-alkylsulphonyl, phenylsulphonyl or C₁—C₄-dialkylamino-sulphonyl group;

R₈ means hydrogen, a halogen atom or a nitro group; and

R₉ denotes hydrogen, a halogen atom or a cyano group, or for an optionally substituted thiazole or thiadiazole radical, especially for a thiazole radical of the formula

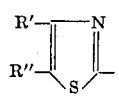

(IV)

in which

R' denotes hydrogen or a C₁—C₄-alkyl group; and

R'' means hydrogen, a nitro group or a phenyl radical which may be substituted by a halogen atom, a C₁—C₄-alkyl, C₁—C₄-alkoxy or a nitro group; or the two radicals together form a fused benzene ring which may be substituted by halogen atoms, C₁—C₄-alkyl, C₁—C₄-alkoxy, C₁—C₄-alkoxycarbonyl or nitro groups, or for an isothiazole radical of the formula

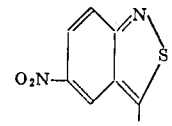

(V)

or for a thiadizole radical of the formula

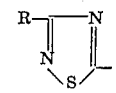

(VI)

in which

R denotes a C₁—C₄-alkyl group or an optionally substituted phenyl radical.

Examples of diazo components of the formula A-NH₂ are the following compounds:

4-chloro-aniline, 2-chloro-aniline, 4-bromo-aniline, 4-methyl-aniline, 4-nitro-aniline, 2-nitro-aniline, 2-methoxy-4-nitro-aniline, 2-chloro-4-nitro-aniline, 4-chloro-2-nitro-aniline, 4-chloro-3-nitro-aniline, 4-cyano-aniline, 4-methoxycarbonyl-aniline, 2,4-, 2,5-, 2,6- and 3,4-dichloro-aniline, 2,4,5-trichloro-aniline, 2,4,5,6-tetrachloro-aniline, pentachloro-aniline, 2,4-dibromo-aniline, 2-methyl-4-chloro-aniline, 2-trifluoromethyl-4-chloro-aniline, 2-cyano-4-chloro-aniline, 2-chloro-4-cyano-aniline, 2-cyano-5-chloro-aniline, 2-cyano-4-nitro-aniline, 2-methoxycarbonyl-4-nitro-aniline, 2-methoxycarbonyl-4-chloro-aniline, 2-chloro-4-ethoxycarbonyl-aniline, 2-nitro-4-butoxycarbonyl-aniline, 2,4-dinitro-aniline, 2,6-dichloro-4-nitro-aniline, 2,6-dibromo-4-nitro-aniline, 2,4-dinitro-6-chloro- or -6-bromo-aniline, 2,6-dichloro-4-cyano-aniline, 2,6-dinitro-4-chloro-aniline, 2-bromo-4-nitro-6-cyano-aniline, 2-chloro-4-nitro-6-cyano-aniline, 4-methylsulphonyl-aniline, 2-bromo-4-ethylsulphonyl-aniline, 2-nitro-4-ethylsulphonyl-aniline, 2-bromo-4-ethyl-sulphonyl-6-nitro-aniline, 2,6-dichloro-aniline-4-sulphonic acid diethylamide, 2,5-dichloro-aniline-4-sulphonic acid dibutylamide, 2 -methoxy-4-nitro-aniline, 2,4-dicyano-aniline, 3,4-dicyano-aniline, 2,4-dicyano-6-chloro-aniline, 2,6-dicyano-6-nitro-aniline, 2,4-dicyano-6-nitro-aniline, 5-amino-3-methyl-thiadiazole-(1,2,4), 5-amino-3-phenyl-thiadiazole-(1,2,4), 5-amino-3-ethylsulphonyl-thiadiazole-(1,2,4), 5-amino-3-benzylmercapto-thiadiazole-(1,2,4), 5-nitro-2-amino-thiazole-(1,3), 2-amino-benzothiazole-(1,3), 2-amino-6-methylsulphonyl-benzothiazole-(1,3), 2-amino-6-thiocyano-benzothiazole-(1,3), 2-amino-5-cyano-thiazole-(1,3), 2-amino-4-methyl-thiazole-(1,3), 2-amino-5-nitro-4-methyl-thiazole-(1,3), 2-amino-4-phenyl-thiazole-(1,3), 2-amino-4-(4-chlorophenyl)-thiazole-(1,3), 2-amino-4-(4-nitrophenyl)-thiazole-(1,3), 2-amino-6-methylbenzothiazole-(1,3), 2-amino-6-methoxy-benzothiazole-(1,3), 2-amino-6-chloro-benzothiazole-(1,3), 2-amino-6-nitro-benzothiazole-(1,3), 2-amino-1,3-benzothiazole-6-carboxylic acid ethyl ester or butyl ester, 2-amino-thiadiazole-(1,3,4), 5-amino-thiadiazole-(1,3,4), 3-amino-5-nitro-benzoisothiazole-(2,1), 3-amino-7-bromo-5-nitro-benzoisothiazole-(2,1).

Organic solvents suitable for the process according to the invention are those solvents which are not miscible with water and the boiling point of which lies between 40° and 150°C, for example, aromatic hydrocarbons, such as toluene, xylene; halogenated hydrocarbons, especially aliphatic chlorinated hydrocarbons, such as methylene chloride, chloroform, carbon tetrachloride, 1,1-dichloroethane, 1,2-dichloroethane, 1,1,2-trichloroethane, 1,1,1,2-tetrachloro-ethane, 1,1,2,2-tetrachloroethane, pentachloroethane, 1-chloropropane, 1,2-dichloropropane, 1,1,1-trichloropropane, 1-chlorobutane, 2-chlorobutane, 1,4-dichlorobutane, 1-chloro-2-methyl-propane or 2-chloro-2-methyl-propane; as well as aliphatic fluorinated and fluoro-chlorinated hydrocarbons, such as perfluoro-n-hexane, 1,2,2-trifluoro-trichloroethane and 1,1,1-trifluoro-pentachloro-propane; and aromatic chlorinated and fluorinated hydrocarbons, such as chlorobenzene, fluorobenzene, chlorotoluene and benzotrifluoride. Tetrachloroethylene, trichloroethylene and 1,1,1-trichloroethane have proved particularly satisfactory.

Furthermore, it has proved advantageous in some cases to add non-ionic auxiliaries to the dyebaths. Suitable non-ionic auxiliaries are primarily the known interface-active ethoxylation and propoxylation products of fatty alcohols, alkylphenols, fatty acid amides and fatty acids, as well as mixtures thereof; the auxiliaries are used in amounts of 0.05 to 2 percent by weight, referred to the weight of the organic solvents. Instead of adding the auxiliaries directly to the dyebaths, they may also be used with advantage for pasting the dyestuffs and thus be added to the dyebaths in the form of a dyestuff/auxiliary paste.

The synthetic fibre materials to be dyed according to the process of the invention are mainly fibre materials of polyesters, for example, polyethylene terephthalates or polyesters from 1,4-bis-(hydroxymethyl)-cyclohexane and terephthalic acid; polycarbonates of 4,4'-dihydroxy-diphenyl-2,2-propane; cellulose triacetate; synthetic polyamides, such as poly-ε-caprolactam, polyhexamethylene diamine adipate or poly-ω-aminoundecanic acid; polyurethanes or polyolefins. The fibre material may be present in the form of fabrics and knitted fabrics.

For dyeing, the dyestuffs to be used according to the invention are dissolved in the water-immiscible organic solvents or they are added to the latter in the form of solutions in solvents of unlimited miscibility with these solvents, such as alcohols, dimethyl formamide, dimethyl acetamide, dimethyl sulphoxide or sulpholane; the synthetic fibre materials are impregnated with the resultant clear dyestuff solutions which may contain soluble non-ionic auxiliaries for improving the levelness of the dyeings, for example, the known interface-active ethoxylation and propoxylation products of fatty alcohols, alkyl-phenols, fatty acid amides and fatty acids. The dyestuffs are subsequently fixed on the fibre materials by means of a heat treatment. The heat treatment may consist in a brief treatment with dry heat at 120° – 230°C with an intermediate drying possibly preceding the dry heat treatment, or in a treatment of the fibre materials in an overheated solvent vapour at 100° – 150°C. Small proportions of non-fixed dyestuff can be washed out by a brief treatment with the cold organic solvent. It should be noted that mixtures of the dyestuffs to be used according to the invention sometimes yield a higher dyestuff yield than the individual dyestuffs and that they may be even more readily soluble in the organic medium.

With the aid of the process according to the invention it is possible to obtain dyeings characterised by a high dyestuff yield, very good build-up and by outstanding fastness properties, especially very good fastness to thermo-fixing, washing, rubbing and light, on synthetic fibre materials by dyeing from organic solvents. Another advantage of the dyestuffs to be used according to the invention is their high solubility in organic solvents, especially in water-immiscible solvents, such s tetrachloroethylene, trichloroethylene, 1,1,1-trichloroethane and 1,1,1-trichloropropane, which enables the dyeing to be carried out without the use of solubilizers.

The parts given in the following Examples are parts by weight.

EXAMPLE 1

A fabric of polyethylene terephthalate fibres is impregnated at room temperature with a clear brown solution containing 10 parts of a dyestuff of the formula

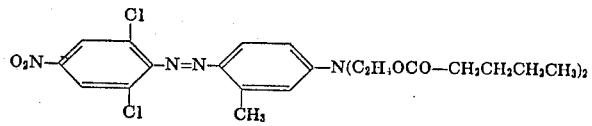

in 990 parts tetrachloroethylene.

After squeezing to a weight increase of 60%, the fabric is dried at 80°C for 1 minute. The dyestuff is subsequently fixed by heating the fabric at 190° – 220°C for 45 seconds. The small proportion of non-fixed dyestuff is subsequently washed out by a brief treatment in cold tetrachloroethylene for 20 seconds. After drying, a yellow-brown dyeing is obtained, which is characterised by its high dyestuff yield, very good build-up and outstanding fastness properties, especially very good fastness to thermofixing, washing, rubbing and light.

Clear yellow-brown dyeings of the same quality were obtained in an analogous manner on fabrics of
a. cellulose triacetate
b. synthetic polyamides or polyurethanes, and
c. polypropylene fibres,
but thermosolisation was carried out for
a. at 200° – 220°C
b. at 170° – 200°C
and
c. at 120° – 150°C.

Equally satisfactory dyeings were also obtained when the 990 parts tetrachloroethylene were replaced with the same amount of one of the following solvents: methylene chloride, chloroform, carbon tetrachloride, tetrachloroethane, dichloropropane, 1,1,1-trichloropropane, chlorobutane, dichlorobutane.

EXAMPLE 2

A knitted fabric of polyhexamethylene-diamine adipate filaments is impregnated at room temperature with an orange solution containing 10 parts of a dyestuff of the formula

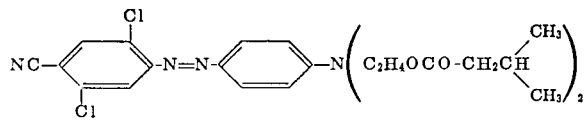

in 990 parts tetrachloroethylene.

After squeezing to a weight increase o 60%, the knitted fabric is dried at 80°C for 1 minute. The dyestuff is subsequently fixed by heating the knitted fabric at 192°C for 45 seconds. Small proportions of non-fixed dyestuff are then washed out by a brief treatment with cold tetrachloroethylene. After drying, a clear orange dyeing is obtained, which is characterised by its high dyestuff yield, very good build-up, and outstanding fastness properties, especially very good fastness to thermofixing, washing, rubbing and light.

A dyeing of the same quality was obtained when the 990 parts tetrachloroethylene were replaced with the same amount of toluene, xylene, chlorobenzene or dichlorobenzene.

EXAMPLE 3

A fabric of polypropylene fibres is impregnated at room temperature with a clear yellow solution containing 10 parts of a dyestuff of the formula

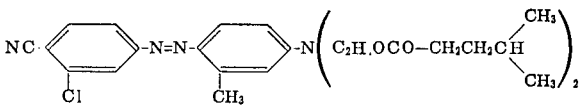

7 parts nonylphenyl heptaethylene glycol ether in 983 parts tetrachloroethylene.

After squeezing to a weight increase of 60 percent, the fabric is dried at 80°C for 1 minute. The dyestuff is subsequently fixed by heating the fabric at 140°C for 30 seconds. Any non-fixed dyestuff particles can be washed out by a brief treatment in the cold solvent. A clear orange dyeing is obtained, which is characterised by its high dyestuff yield, very good build-up and outstanding fastness properties, especially very good fastness to thermofixing, washing, rubbing and light.

EXAMPLE 4

A fabric of poly-1,4-cyclohexane-dimethylene terephthalate is impregnated at room temperature with a clear blue solution containing 10 parts of a dyestuff of the formula

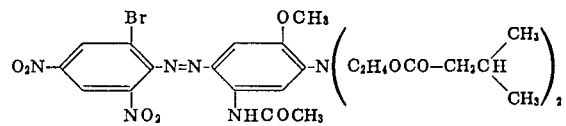

in 990 parts tetrachloroethylene.

After squeezing to a weight increase of 60%, the fabric is dried at 80°C for 1 minute. The dyestuff is subsequently fixed by heating the fabric at 190° – 220°C for 45 seconds. The small proportion of non-fixed dyestuff is subsequently washed out by a brief treatment in cold tetrachloroethylene. After drying, a blue dyeing is obtained, which is characterised by its high dyestuff yield, very good build-up and outstanding fastness properties, especially very good fastness to thermofixing, washing, rubbing and light.

Dyeings of equally satisfactory fastness properties were obtained in the shades stated in the following Table on fabrics of polyester, triacetate, polyamide, polyurethane or polyolefine fibres when the dyestuff mentioned in Example 4 was replaced with the same amount of one of the dyestuffs listed in the following Table.

| Dyestuff | Shade |
|---|---|
| $O_2N-\underset{CN}{C_6H_3}-N=N-\underset{CH_3}{C_6H_3}-N(C_2H_4OCO-CH_2CH_2CH_2CH_3)_2$ | Ruby. |
| $O_2N-\underset{CN}{\overset{Cl}{C_6H_2}}-N=N-\underset{CH_3}{C_6H_3}-N(C_2H_4OCO-CH_2CH(CH_3)_2)_2$ | Red-violet. |
| $NC-\underset{CN}{C_6H_3}-N=N-\underset{CH_3}{C_6H_3}-N(C_2H_4OCO-CH_2CH(CH_3)_2)_2$ | Orange. |
| $O_2N-\underset{CN}{\overset{Br}{C_6H_2}}-N=N-\underset{CH_3}{C_6H_3}-N(C_2H_4OCO-CH_2CH_2CH(CH_3)_2)_2$ | Violet. |
| $O_2N-\underset{Cl}{C_6H_3}-N=N-C_6H_4-N(C_2H_4OCO-(CH_2)_6CH_3)_2$ | Red-orange. |
| $O_2N-\underset{Cl}{C_6H_3}-N=N-\underset{CH_3}{C_6H_3}-N(C_2H_4OCO-(CH_2)_6CH_3)_2$ | Red. |

TABLE—Continued
| Dyestuff | Shade |
|---|---|
| 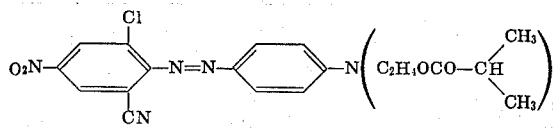 | Bordeaux. |
| 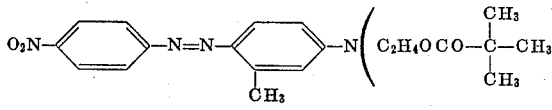 | Red-orange. |
| 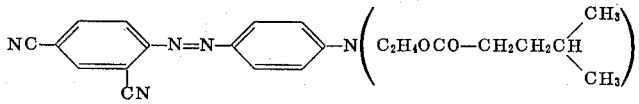 | Do. |
| 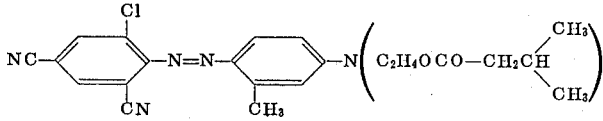 | Red. |
| 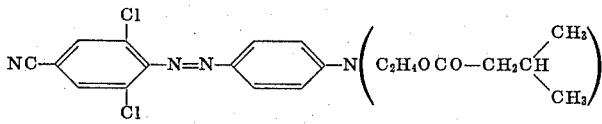 | Yellowish orange. |
| 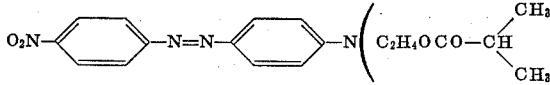 | Red-orange. |
| 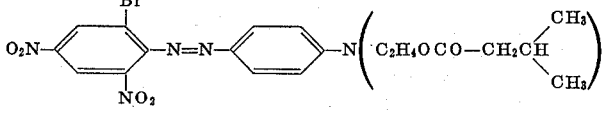 | Violet. |
| 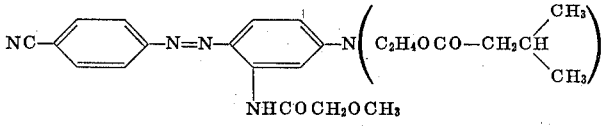 | Yellowish orange. |
| 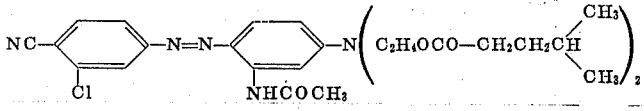 | Orange. |
| 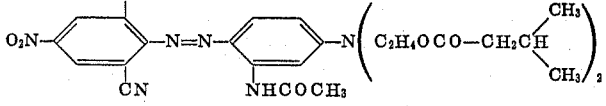 | Bluish violet. |
| 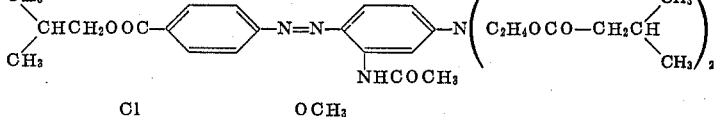 | Yellowish orange. |
| 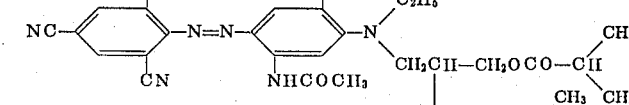 | Blue. |
| 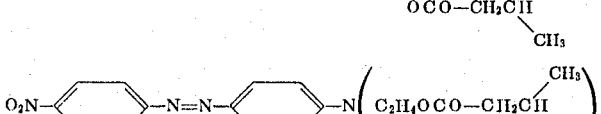 | Bluish ruby. |
| 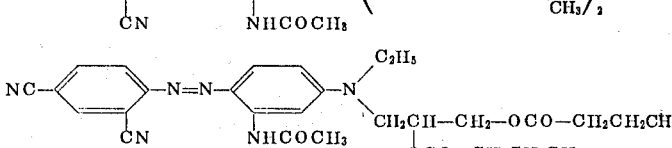 | Bluish red. |

TABLE—Continued
| Dyestuff | Shade |
|---|---|
|  | Red. |
| 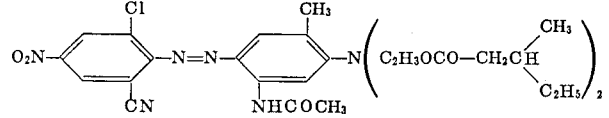 | Blue. |
| 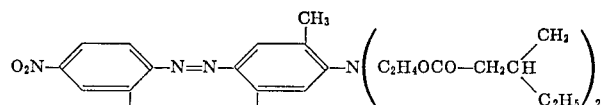 | Bluish ruby. |
| 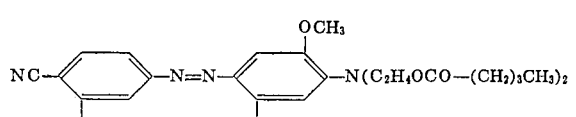 | Yellow-brown. |
| 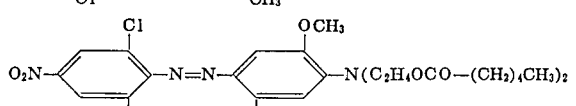 | Brown. |
| 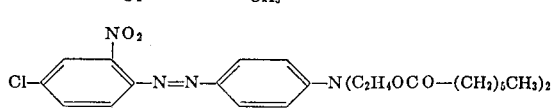 | Orange. |
| 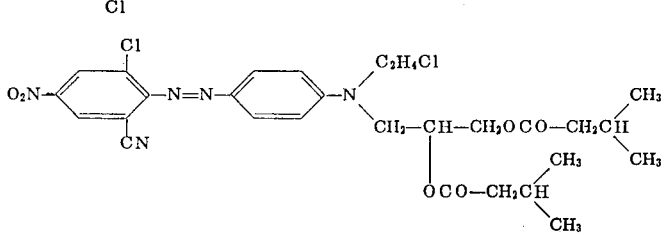 | Violet. |
| 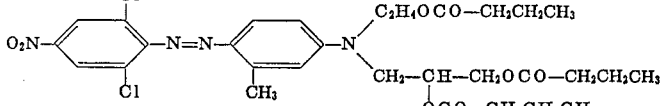 | Reddish brown. |
| 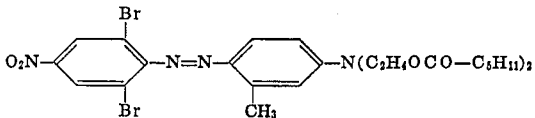 | Reddish brown. |
| 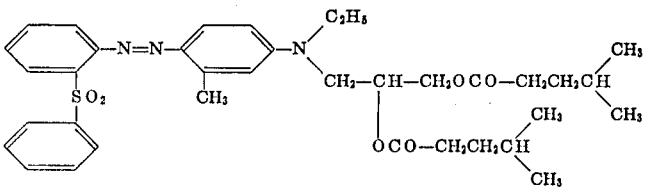 | Orange. |
| 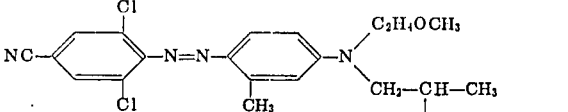 | Do. |
| 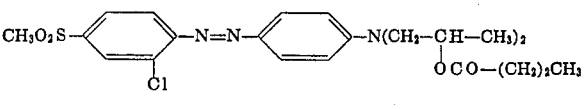 | Do. |
| 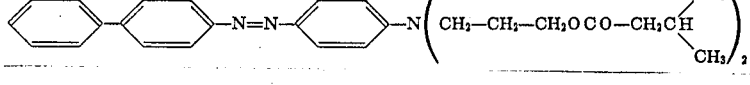 | Do. |

TABLE—Continued

| Dyestuff | Shade |
|---|---|
| $O_2N-\bigcirc(Br)-N=N-\bigcirc(CH_3)-N(CH_2CH_2CH_2-OCO-C_3H_7)$ | Red. |
| $O_2N-\bigcirc-N=N-\bigcirc(NHCOCH_2Cl)-N(C_2H_5)(CH_2CH(OCO-CH_2CH(CH_3)C_2H_5)CH_2OCO-CH_2CH(CH_3)C_2H_5)$ | Red. |
| $CH_3SO_2-\bigcirc-N=N-\bigcirc-N(C_2H_4OCO-C_2H_6Cl)_2$ | Orange. |
| $O_2N-\bigcirc(CN)-N=N-\bigcirc(OCH_3)-N(C_2H_4OCO-(CH_2)_3CH_3)_2$ | Bluish red. |
| $O_2N-\bigcirc(Cl)-N=N-\bigcirc(Br)-N(C_2H_4OCO-CH(CH_3)_2)_2$ | Red. |
| $O_2N-\bigcirc(OCH_3)-N=N-\bigcirc-N(C_2H_4OCO-(CH_2)_2CH_3)_2$ | Red. |
| $Cl_3,CN\text{-substituted}-\bigcirc-N=N-\bigcirc(CH_3)-N(C_2H_4OCO-CH_2CH(CH_3)_2)_2$ | Red. |
| $NC,Cl_3\text{-substituted}-\bigcirc-N=N-\bigcirc-N(C_2H_4OCO-CH_2CH(CH_3)_2)_2$ | Red. |
| $O_2N-\bigcirc(CN)-N=N-\bigcirc(Cl,Cl)-N(C_2H_4OCO-CH_2CH(CH_3)_2)_2$ | Bluish red. |
| $O_2N-\bigcirc(CN)-N=N-\bigcirc(Cl,CH_3)-N(C_2H_4OCO-(CH_2)_3CH_3)_2$ | Do. |
| $O_2N-\bigcirc(CN)-N=N-\bigcirc(Br,NHCOCH_3)-N(C_2H_4OCO-CH_2CH(CH_3)_2)_2$ | Violet. |
| $O_2N-\bigcirc(Cl,CN)-N=N-\bigcirc(Cl,NHCOOCH_3)-N(C_2H_4OCO-CH_2CH(CH_3)_2)(CH_2-CH(OCO-CH_2CH(CH_3)_2)-CH_2OCO-CH_2CH(CH_3)_2)$ | Reddish blue. |
| $O_2N-\bigcirc(Br,NO_2)-N=N-\bigcirc(OCH_3,NHCON(CH_3)_2)-N(C_2H_4OCO-CH_2CH(CH_3)_2)_2$ | Dark blue. |
| $NC,NC,Cl,Cl\text{-substituted}-\bigcirc-N=N-\bigcirc-N(C_2H_4OCO-CH_2CH(CH_3)_2)_2$ | Red. |

TABLE—Continued
| Dyestuff | Shade |
|---|---|
| 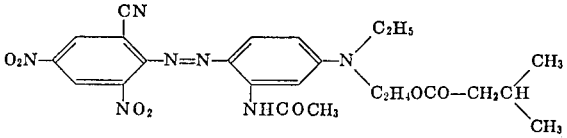 | Blue. |
| 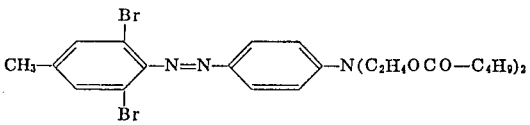 | Orange. |
| 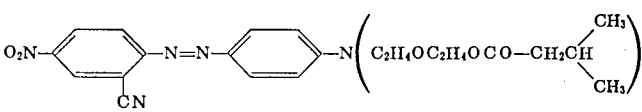 | Red. |
| 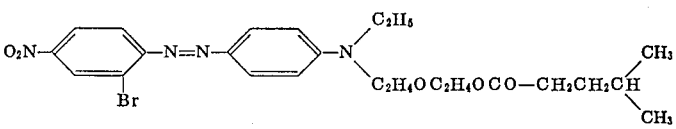 | Red. |
| 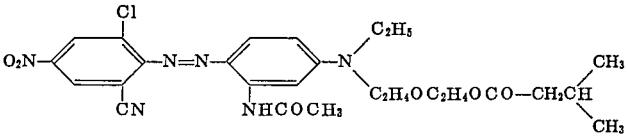 | Blue. |
| 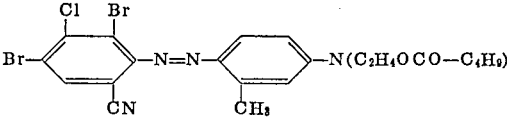 | Orange. |
| 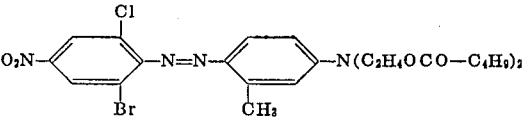 | Yellow-brown. |
| 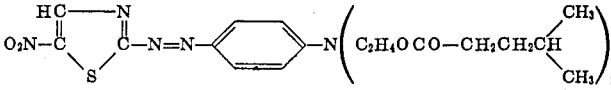 | Violet. |
| 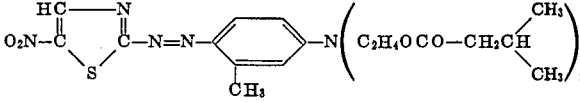 | Do. |
| 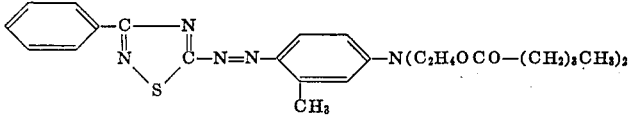 | Red. |
| 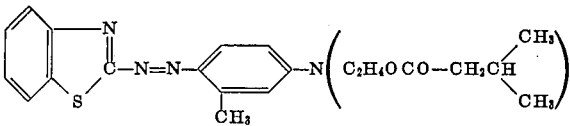 | Red. |
| 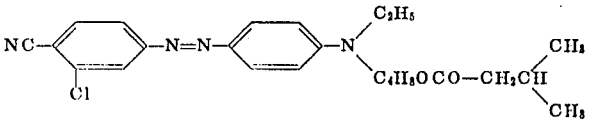 | Orange. |
| 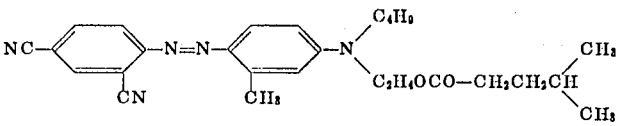 | Red. |
| 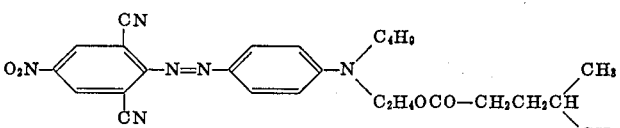 | Blue. |

EXAMPLE 5

A fabric of polyethylene terephthalate fibres is impregnated at room temperature with a clear red solution containing 10 parts of a dyestuff of the formula

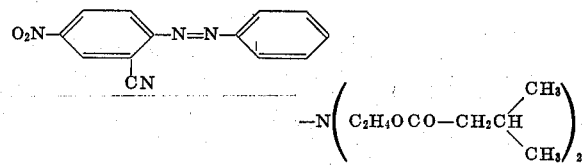

7 parts nonylphenol heptaethylene glycol ether in 983 parts tetrachloroethylene.

After squeezing to a weight increase of 60 percent, the fabric is dried at 80°C for 1 minute. The dyestuff is subsequently fixed by heating the fabric at 190° – 220°C for 45 seconds. The small proportion of non-fixed dyestuff is then washed out by briefly rinsing with cold tetrachloroethylene. After drying, a clear red dyeing is obtained, which is characterized by its high dyestuff yield, very good build-up and outstanding fastness properties, especially very good fastness to thermofixing, washing, rubbing and light.

EXAMPLE 6

A fabric of polyethylene terephthalate fibres is impregnated at room temperature with a clear violet solution containing 10 parts of a dyestuff of the formula

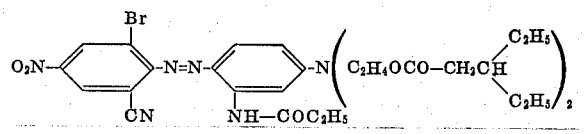

in 990 parts 1,1,1-trichloroethane.

After squeezing to a weight increase of 60 percent, the dyestuff is fixed by treating the fabric with overheated 1,1,1-trichloroethane vapour at 140°C for 45 seconds. The small proportion of non-fixed dyestuff is subsequently washed out by briefly rinsing in cold 1,1,1-trichloroethane. After drying, a clear violet dyeing is obtained, which is characterised by its high dyestuff yield, very good build-up and outstanding fastness properties.

EXAMPLE 7

A fabric of poly-1,4-cyclohexane-dimethylene terephthalate is impregnated at room temperature with a clear red solution containing 10 parts of a dyestuff of the formula

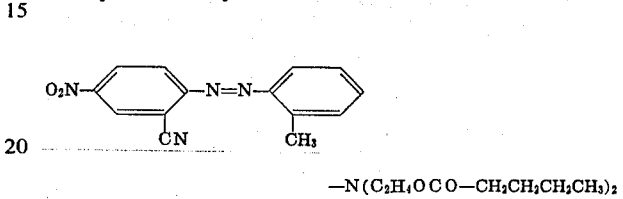

in 990 parts tetrachloroethylene.

After squeezing to a weight increase of 60 percent, the dyestuff is fixed by treating the fabric with overheated tetrachloroethylene vapour at 150°C for 35 seconds. The small proportion of non-fixed dyestuff is then washed out by briefly rinsing in cold tetrachloroethylene. After drying, a clear red dyeing is obtained, which is characterised by its high dyestuff yield, very good build-up and outstanding fastness properties.

Dyeings of equally satisfactory fastness properties were obtained in the shades given in the following Table on fabrics of polyester, triacetate, polyamide, polyurethane or polyolefine fibres, when the dyestuff mentioned in Example 1 was replaced with the same amount of one of the dyestuffs listed in the following Table:

| Dyestuff | Shade |
|---|---|
| $O_2N-\underset{Cl}{C_6H_3}-N=N-C_6H_4-N(CH_2CH_2OCO-C(CH_3)_3)_2$ | Yellowish-red. |
| $O_2N-\underset{CN}{C_6H_3}-N=N-C_6H_4-N(CH_2CH_2OCO-C(CH_3)_3)_2$ | Red. |
| $O_2N-\underset{Cl}{\underset{Cl}{C_6H_2}}-N=N-C_6H_4-N(CH_2CH_2OCO-C(CH_3)_3)_2$ | Yellow-brown. |
| $O_2N-\underset{Cl}{C_6H_3}-N=N-\underset{CH_3}{C_6H_3}-N(CH_2CH_2OCO-C(CH_3)_3)_2$ | Red. |
| $O_2N-\underset{Cl}{C_6H_3}-N=N-\underset{CH_3}{C_6H_3}-N(CH_2CH_2OCO-CH(C_2H_5)_2)_2$ | Red. |
| $O_2N-\underset{CN}{C_6H_3}-N=N-\underset{CH_3}{C_6H_3}-N(CH_2CH_2OCO-CH(C_2H_5)_2)_2$ | Bluish-red. |

TABLE—Continued
| Dyestuff | Shade |
|---|---|
| 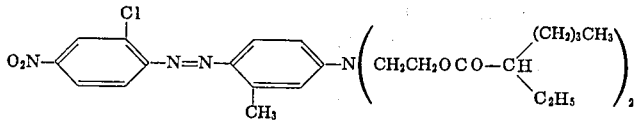 | Red. |
| 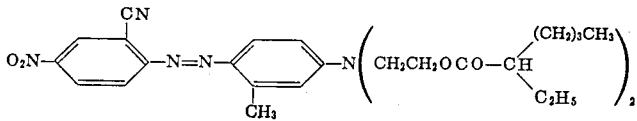 | Ruby. |
| 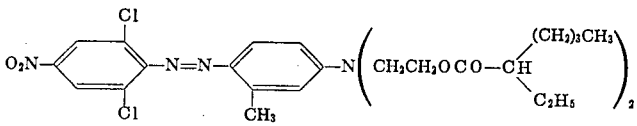 | Yellow-brown. |
| 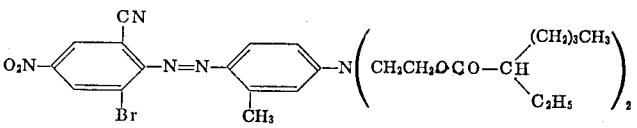 | Violet. |
| 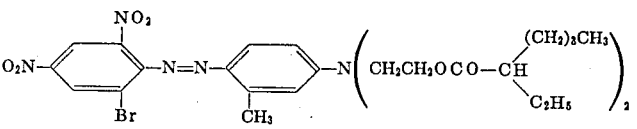 | Do. |
| 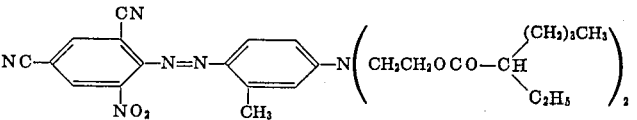 | Bluish ruby. |
| 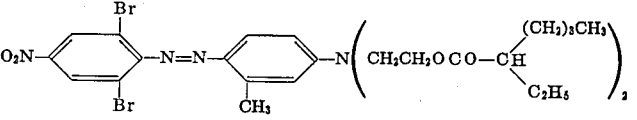 | Red-brown. |
| 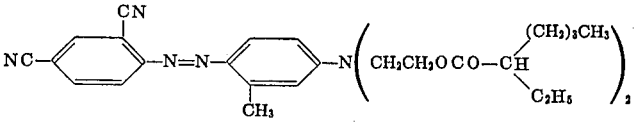 | Red. |
| 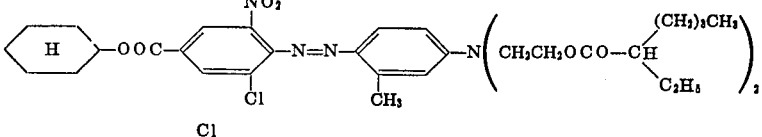 | Red. |
| 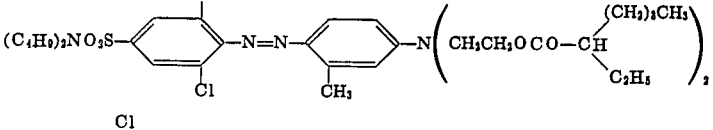 | Orange. |
| 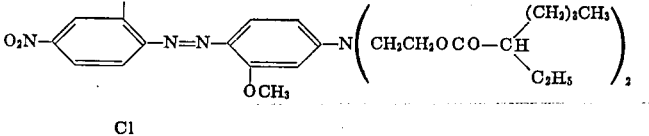 | Bluish red. |
| 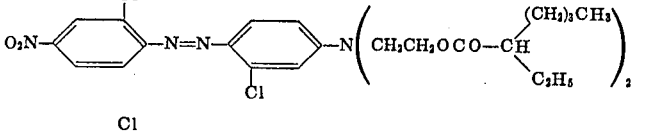 | Do. |
| 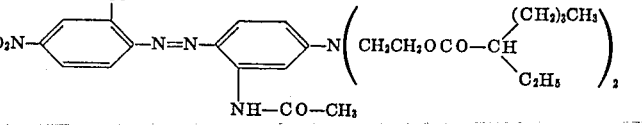 | Do. |

TABLE—Continued

| Dyestuff | Shade |
|---|---|
| (structure) | Do. |
| (structure) | Do. |
| (structure) | Red. |
| (structure) | Violet. |
| (structure) | Blue. |
| (structure) | Do. |
| (structure) | Navy-blue. |
| (structure) | Blue. |
| (structure) | Do. |
| (structure) | Do. |
| (structure) | Do. |
| (structure) | Do. |

TABLE—Continued

| Dyestuff | Shade |
|---|---|
| O₂N–C₆H₂(Cl)(NO₂... )–N=N–C₆H₄–N(C₂H₅)(CH₂CH₂OCO–CH((CH₂)₃CH₃)(C₂H₅)) | Yellowish red. |
| O₂N–C₆H₂(CN)–N=N–C₆H₃(CH₃)–N(C₄H₉)(CH₂CH₂OCO–CH(C₂H₅)₂) | Red. |
| O₂N–C₆H₂(NO₂)(Br)–N=N–C₆H₂(OCH₃)(CH₃)–N(C₃H₇)(CH₂CH₂OCH₂CH₂OCO–C(CH₃)₃) | Blue. |
| O₂N–C₆H₃(CN)–N=N–C₆H₃(OCH₃)–N(C₂H₅)(CH₂CH₂OCO–(CH₂)₁₅CH₃) | Bluish red. |
| O₂N–C₆H₂(CN)(Br)–N=N–C₆H₂(OCH₃)(NHCO–C₃H₇)–N(C₂H₅)(CH₂CH₂OCO–CH((CH₂)₃CH₃)(C₂H₅)) | Blue. |
| O₂N–C₆H₂(CN)(Cl)–N=N–C₆H₂(OC₂H₅)(NH–CO–C(CH₃)₃)–N(CH₃)(CH₂CH₂OCO–C(CH₃)₃) | Do. |
| O₂N–C₆H₂(NO₂)(Br)–N=N–C₆H₂(OCH₃)(NH–CO–C₂H₅)–N(CH₂C₆H₅)(CH₂CH₂OCO–C(CH₃)) | Do. |
| O₂N–C₆H₂(Cl)–N=N–C₆H₃(CH₃)–N(CH₂CH₂C₆H₅)(CH₂CH₂OCO–(CH₂)₁₆–CH₃) | Red. |
| O₂N–C₆H₃(CN)–N=N–C₆H₃(OCH₃)–N(CH₂C₆H₅)(CH₂CH₂OCO–C₆H₄–C(CH₃)₃) | Bluish red. |
| H₉C₄OOC–C₆H₂(NO₂)(Br)–N=N–C₆H₃(CH₃)–N(CH₂CH₂OCH₃)(CH₂CH₂OCO–CH((CH₂)₃CH₃)(C₂H₅)) | Do. |
| O₂N–C₆H₂(Cl)–N=N–C₆H₄–N(CH₂CH₂CN)(CH₂CH₂OCO–CH(C₂H₅)₂) | Yellowish red. |
| O₂N–C₆H₂(Cl)(Cl)–N=N–C₆H₃(CH₃)–N(CH₂CH₂CO(CH₂)₃CH₃)(CH₂CH₂OCO–CH((CH₂)₃CH₃)(C₂H₅)) | Brown. |
| O₂N–C₆H₃(CN)–N=N–C₆H₃(Cl)–N(CH₂CH₂CN)(CH₂CH₂OCO–C₆H₄–CH₃) | Bluish red. |

TABLE—Continued

| Dyestuff | Shade |
|---|---|
| Structure with $O_2N$-phenyl ($NO_2$, $Br$)–$N=N$–phenyl ($CH_3$, $OCH_3$)–$N(CH_2CH_2CN)(CH_2CH_2OCO-(CH_2)_{16}CH_3)$ | Reddish blue. |
| Structure with $O_2N$-phenyl ($CN$, $Cl$)–$N=N$–phenyl ($OCH_3$, $NH-CO-C_3H_7$)–$N(CH_2CH_2CN)(CH_2CH_2OCO-C_3H_7)$ | Blue. |
| Structure with $O_2N$-phenyl ($CN$, $Br$)–$N=N$–phenyl ($OC_2H_5$, $NH-CO-N(C_4H_9)_2$)–$N(CH_2CH_2CN)(CH_2CH_2OCO-C(CH_3)_3)$ | Do. |
| Structure with $O_2N$-phenyl ($NO_2$, $Cl$)–$N=N$–phenyl ($OCH_3$, $NH-CO-CH((CH_2)_3CH_3)(C_2H_5)$)–$N(CH_2CH_2CN)(CH_2CH_2OCO-CH((CH_2)_3CH_3)(C_2H_5))$ | Do. |
| Structure with $O_2N$-phenyl ($CN$, $Cl$)–$N=N$–phenyl ($OCH_3$, $NH-CO-C_6H_4-C(CH_3)_3$)–$N(CH_2CH_2CN)(CH_2CH_2OCO-C(CH_3)_3)$ | Do. |
| Structure with $Cl$-phenyl ($CF_3$)–$N=N$–phenyl ($NH-CO-C(CH_3)_3$)–$N(C_2H_5)(CH_2CH_2OCO-C(CH_3)_3)$ | Orange. |
| Structure with 2,4,5-trichlorophenyl–$N=N$–phenyl ($CH_3$)–$N(CH_2CH_2CN)(CH_2CH_2OCO-CH((CH_2)_3CH_3)(C_2H_5))$ | Yellowish orange. |
| Structure with $Cl$-phenyl ($CN$)–$N=N$–phenyl ($NH-CO-CH(C_2H_5)_2$)–$N(C_3H_7)(CH_2CH_2OCO-CH(C_2H_5)_2)$ | Red. |
| Structure with $H_5C_2OOC$-phenyl ($Cl$)–$N=N$–phenyl ($NH-CO-CH_3$)–$N(CH_2CH_2OCO-CH(C_2H_5)_2)_2$ | Reddish orange. |
| Structure with 2,3,4,5-tetrachlorophenyl–$N=N$–phenyl ($CH_3$)–$N(CH_2CH_2OCO-CH((CH_2)_3CH_3)(C_2H_5))_2$ | Orange. |
| Structure with $O_2N$-phenyl ($OC_2H_5$)–$N=N$–phenyl ($NH-CO-OC_2H_5$)–$N(CH_2CH_2OCO-C_6H_4-CH_3)_2$ | Do. |
| Structure with $H_5C_2O_2S$-phenyl–$N=N$–phenyl ($CH_3$)–$N(C_4H_9)(CH_2CH_2OCH_2CH_2OCO-(CH_2)_{16}CH_3)$ | Do. |

TABLE—Continued
| Dyestuff | Shade |
|---|---|
| 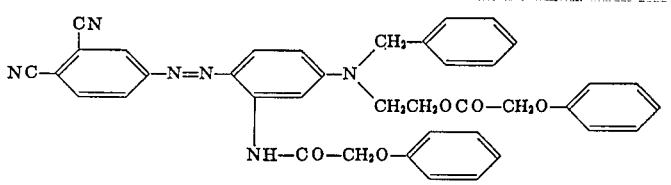 | Red. |
| 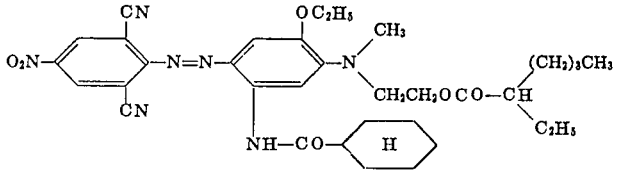 | Blue. |
| 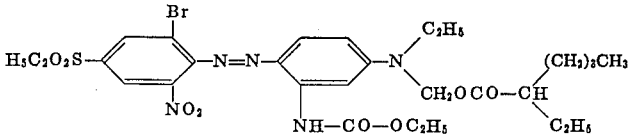 | Bluish red. |
| 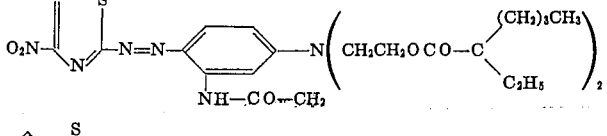 | Violet. |
| 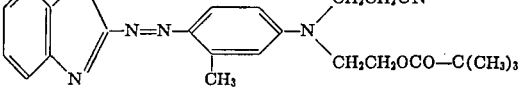 | Red. |
| 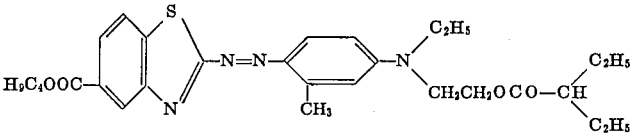 | Red. |
| 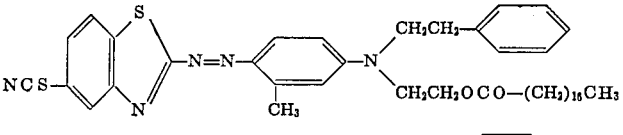 | Red. |
| 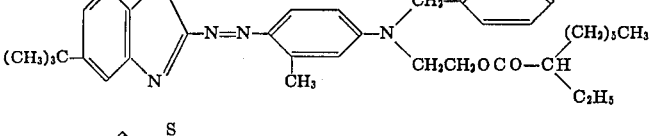 | Red. |
| 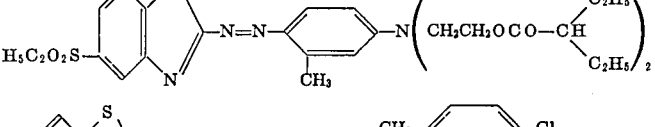 | Red. |
| 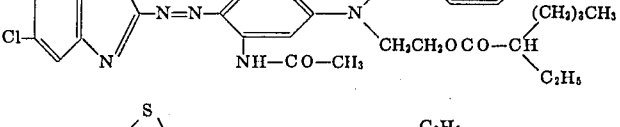 | Bluish red. |
| 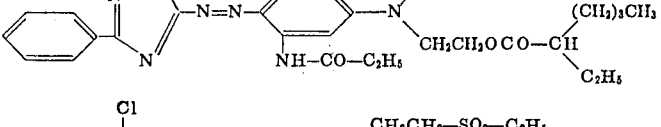 | Scarlet. |
| 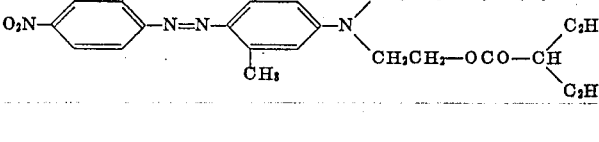 | Red. |

| Dyestuff | Shade |
|---|---|
| 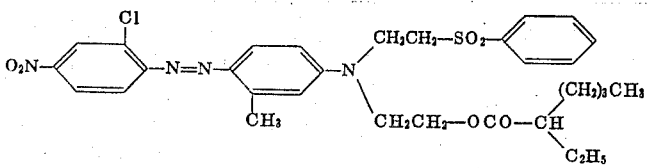 | Red. |
| 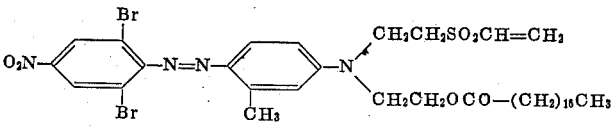 | Reddish brown. |

EXAMPLE 8

A fabric of polyethylene terephthalate fibres is impregnated at room temperature with a clear blue-violet solution containing 5 parts of the azo dyestuff 2,4-dinitro-6-bromoaniline → 4-diethyl-acetylamino-2-N,N-bis-[β-(pentyl-(3)-carbonyloxy)-ethyl]-anisole and 5 parts of the azo dyestuff 2,4-dinitro-6-chloroaniline → 4-diethyl-acetylamino-2-N,N-bis-[β-(pentyl-(3)-carbonyloxy)-ethyl]-phenetole in 990 parts 1,1,1-trichloroethane.

After squeezing to a weight increase of 60 percent, the dyestuff is fixed by treating the fabric with overheated 1,1,1-trichloroethane vapour at 140°C for 45 seconds. The small proportion of non-fixed dyestuff is subsequently washed out by briefly rinsing in cold 1,1,1-trichloroethane. After drying, a reddish navy-blue dyeing is obtained, which is characterised by its high dyestuff yield, very good build-up and outstanding fastness properties.

EXAMPLE 9

A fabric of cellulose triacetate fibres is impregnated at room temperature with a clear blue-violet solution containing 10 parts of the azo dyestuff 2,4-dinitro-6-bromoaniline → 4-(2-ethyl-hexanoylamino)-2-N-ethyl-N-[β-(t-butylcarbonyloxy)-ethyl]-anisole and 7 parts nonylphenol heptaethylene glycol ether in 983 parts tetrachloroethylene.

After squeezing to a weight increase of 60 percent, the fabric is dried at 80°C for 1 minute. The dyestuff is subsequently fixed by heating the fabric at 215°C for 1 minute. A reddish navy-blue dyeing is obtained, which is characterised by its high dyestuff yield, very good build-up and outstanding fastness properties, especially very good fastness to thermofixing, washing, rubbing and light.

We claim:

1. Process for the continuous dyeing of synthetic polyester fiber material comprising the steps of
    A. impregnating the fiber material with a nonaqueous dyeing liquor said liquor consisting essentially of an organic solvent and an azo dyestuff, said organic solvent consisting of water-immiscible halogenated hydrocarbon boiling between 40° and 150°C, said azo dyestuff having the formula

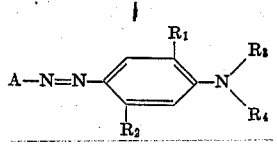

in which A is a carbo- or heterocyclic diazo component;

$R_1$ is hydrogen, chlorine, bromine, methyl, methoxy or ethoxy;

$R_2$ is hydrogen, chlorine, bromine, methyl, methoxy, ethoxy or acylamino of the formula —NH—CO—$R_5$ where $R_5$ is $C_1$—$C_{17}$-alkyl; cycloalkyl; benzyl; phenyl; phenyl substituted by $C_1$—$C_4$-alkyl; phenoxymethyl; acyloxymethyl with one–18 carbon atoms in the acyl radical; methoxy-methyl; chloromethyl; $C_1$—$C_{18}$-alkoxy; or dialkylamino of one–18 carbon atoms;

$R_3$ is $+C_nH_{2n}$-O$-_m$ CO$+R_6$ or

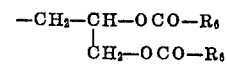

$R_6$ is $C_3$—$C_{17}$-alkyl; cycloalkyl; phenyl; phenyl substituted by $C_1$—$C_{12}$-alkyl; benzyl; phenoxymethyl; benzyl or phenoxymethyl substituted by $C_1$—$C_{12}$-alkyl;

$m$ is 1 or 2;

$n$ is 1, 2 or 3;

$R_4$ is hydrogen; $C_1$—$C_6$-alkyl; benzyl or benzyl substituted by halogen, $C_1$—$C_4$-alkyl or $C_1$—$C_4$-alkoxy; β-phenylethyl; β-cyanoethyl; β-methoxyethyl; β-ethoxyethyl; β-$C_1$-$C_8$-alkylsulfonylethyl; β-phenylsulfonylethyl or β-vinylsulfonylethyl; or $R_4$ has the same meaning as $R_3$;

with the proviso that the total of carbon atoms in $R_1$, $R_2$, $R_3$ and $R_4$ is 6 to 28;

B. subjecting the fiber material to a heat-treatment to fix said azo dyestuff on said fiber.

2. The process of claim 1 in which the sum of carbon atoms in $R_1$, $R_2$, $R_3$ and $R_4$ is 10 to 20.

3. The process of claim 1 in which $R_6$ is $C_4$—$C_7$-alkyl.

4. The process of claim 1 in which $R_6$ is heptyl-(3).

5. The process of claim 1 in which A is a phenyl radical of the formula

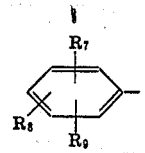

in which $R_7$ is halogen, $C_1$—$C_4$-alkyl, $C_1$—$C_4$-alkoxy, $C_1$—$C_4$-alkoxycarbonyl, cyclohexoxycarbonyl, trifluoromethyl, nitro, cyano, $C_1$—$C_2$-alkylsulfonyl, phenyl-sulfonyl or $C_1$—$C_{14}$-dialkylaminosulfonyl;

$R_8$ is hydrogen, halogen or nitro; and $R_9$ is hydrogen, halogen or cyano.

6. The process of claim 1 in which A is a substituted or unsubstituted thiazole or a substituted or unsubstituted thiadiazole.

7. The process of claim 1 in which A is a thiazole radical of the formula

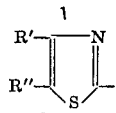

in which R' is hydrogen or $C_1$—$C_4$-alkyl; R'' is hydrogen; nitro; phenyl or phenyl substituted by halogen, $C_1$—$C_4$alkyl, $C_1$—$C_4$-alkoxy or nitro; or R' and R'' together form a fused benzene ring which may be substituted by halogen, $C_1$—$C_4$-alkyl, $C_1$—$C_4$-alkoxy, $C_1$—$C_4$-alkoxycarbonyl, $C_1$—$C_2$-alkylsulfonyl or nitro.

8. The process of claim 1 in which A is a isothiazole radical of the formula

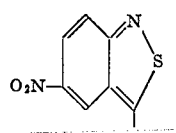

9. The process of claim 1 in which A is a thiadiazole radical of the formula

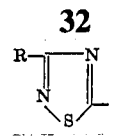

in which R is $C_1$—$C_4$-alkyl; phenyl, or substituted phenyl.

10. The process of claim 1 in which said azo dye-stuff is soluble in said water-immiscible organic solvent.

11. The process of claim 10 in which the dyed material is subjected to a subsequent step of (C) rinsing with water-immiscible organic solvent in which said azo dye-stuff is soluble.

12. The process of claim 1 in which said water-immiscible organic solvent is an aliphatic chlorohydrocarbon having a boiling point of between 40° and 150°C.

13. The process of claim 1 in which said water-immiscible organic solvent is selected from the group consisting of tetrachloroethylene, trichloroethylene, 1,1,1-trichloroethane and 1,1,1-trichloropropane.

14. The process of claim 1 in which said heat-treatment is conducted with dry heat at 120°–230°C.

15. The process of claim 1 in which said heat treatment is conducted with solvent vapor at 100°–150°C.

* * * * *